United States Patent Office 3,483,127
Patented Dec. 9, 1969

3,483,127
NITROGEN-CONTAINING ALDONIC ACID COMPOSITION AND PROCESS OF PRODUCTION
Julius Benko, Quebec City, Quebec, Canada, assignor to Lignosol Chemicals Limited, Quebec, Canada
No Drawing. Filed June 20, 1966, Ser. No. 558,574
Int. Cl. C02b 5/06, 1/18
U.S. Cl. 252—180
11 Claims

ABSTRACT OF THE DISCLOSURE

This invention relates to a sequestering and paint stripping composition consisting of a mixture of aldonic and nitrogen-containing aldonic acids. The aldonic acids are prepared by reacting the monosaccharides present in spent sulphite liquor with an excess of an alkali metal cyanide and by hydrolyzing the cyanohydrins thus produced by heating under reflux conditions.

---

This invention relates to the conversion of the monosaccharides found in spent sulphite liquor into a mixture of aldonic and nitrogen-containing aldonic acids to provide a composition which is effective as a sequestering agent and as a paint stripping agent.

The sequestering property of the composition enables it to be used effectively in detergent mixtures where it suppresses the formation of deposits from hard water. Additionally, the ability of the composition to sequester iron leads to many useful applications where the removal of iron rust is involved.

Sodium lignosulphonate derived from spent sulphite liquor is known to be moderately effective, without further treatment, as a component of glass and metal cleaning compositions, since it has a chelating capacity for calcium, iron and aluminum.

A principal object of this invention is to provide a means for increasing the initial chelating capacity of the lignosulphonates in spent sulphite liquor by converting the monosaccharides present in said liquors into a mixture of aldonic and nitrogen-containing aldonic acids.

The monosaccharides may be converted into aldonic and nitrogen-containing aldonic acids with the same ease in all spent sulphite liquors, that is, in sodium, ammonium, calcium, and magnesium base spent sulphite liquors. However, the use of calcium and magnesium base spent sulphite liquors results in products of inferior quality, since part of the chelating capacity is used for the chelation of the pulping bases. Therefore the use of sodium and ammonium base spent sulphite liquors is preferred. With respect to the quality of the resulting product, it is immaterial whether a sodium or ammonium base material is used in the pulping process or whether one of these cations is used to replace calcium or magnesium following the cook, using any of the methods known to those familiar with the art.

Spent sulphite liquors contain monosaccharides in the amount of from about 13% to about 20%, on the average about 18%, of the total solids. In spent sulphite liquors derived from softwoods pentoses (xylose and arabinose) account for about 20% of the total sugars, while hexoses (mannose, glucose, galactose) account for the remaining 80%. In spent sulphite liquors derived from hardwoods, there is a higher percentage of pentoses with a corresponding lower hexose content. Since all of these sugars reduce Fehling's solution, it is the practice to estimate the total monosaccharide content of the spent liquor with this reagent and to express the result as one sugar, glucose.

It is well known that monosaccharides readily combine with hydrogen cyanide to form cyanohydrins and that the cyanohydrins can be hydrolyzed to produce aldonic acids having one more carbon atom in the chain than the original sugars. The hydrolysis step of this aldonic acid synthesis is accompanied by the evolution of ammonia.

Although gaseous hydrogen cyanide can be used in preparing the cyanohydrin, an alkali cyanide is generally used as a safety measure and for convenience. Sodium cyanide is preferred; however, potassium cyanide can be used with similar results but at a higher cost. The use of calcium cyanide would be detrimental for the same reason as the use of calcium base spent sulphite liquor.

As a further safety measure, the hydrolysis step of the aldonic acid synthesis is carried out under alkaline conditions. To avoid side-reactions in this synthesis, the cyanide addition to the sugar solution is usually carried out under cooling and in dilute solution. Under these conditions it normally requires a period of twenty-four hours for the reducing sugars to disappear and a further reaction time of from six to eight hours at elevated temperatures to hydrolyze the nitrile and to expel ammonia.

In the presence of lignosulphonates, the addition reaction for preparing the cyanohydrin takes place even more slowly as evidenced by the fact that 30% of the reducing sugars remains unreacted after a reaction period of twenty-three hours at room temperature.

A novel feature of the present invention is the discovery that the reaction can be completed in from 1½ to 6 hours by adding the cyanide to concentrated spent sulphite liquor solutions at 40° to 80° C., preferably at 60° to 80° C., and completing the hydrolysis step at reflux temperatures, preferably under pressure. The hydrolysis step may be extended from a period of about 2 hours to 24 hours at reflux temperatures or to about 6 hours at 140° C. without any detrimental effects in regard to product quality. Shorter hydrolysis periods can be used particularly if a high content of nitrogen-containing aldonic acids is not required in the product.

The nitrogen-containing aldonic acid content in the product is primarily adjusted through the ammonia concentration in the reaction mixture. A low percent of nitrogen-containing aldonic acids is obtained when ammonia is continuously removed from the reactor during the entire reaction period, while the highest percentage is obtained when the reaction is carried out in a closed autoclave (with a pressure in the range of about 30 to 50 p.s.i. at reflux temperatures) with the introduction of additional ammonia.

It is well known that the reducing sugar content of spent liquor solutions may vary from time to time. Under some circumstances, it may be advisable to add an amount of hydrolyzed cane sugar to the liquor solution to ensure obtaining a product having a uniform aldonic acid composition. Commercially available glucose can also be used to adjust the reducing sugar content of the spent liquor solution to a predetermined level.

Under the reaction conditions according to the present invention, 20% to 80% of the nitrogen initially present as cyanide remains as bound nitrogen, without adversely affecting the chelating and paint stripping properties of the aldonic acids formed by the reaction. It appears probable that the bound nitrogen content of the reaction product is present as amino and/or imino groups and originates from the interaction of ammonia, evolved during the hydrolysis step, with the reducing sugars or with the aldonic acids, hence the nitrogen-containing aldonic acids could be considered aminoaldonic acids.

This process of reacting reducing sugars and cyanide at elevated temperatures and in concentrated solutions is contrary to all known procedures for producing pure aldonic acids. The process of the present invention results in an increased percentage of nitrogen-containing aldonic acids. This mixture of aldonic acids has been found to be at least equal to the pure aldonic acids as sequestrants and paint stripping agents. Moreover, it is obvious that the pure aldonic acids are prepared under markedly more expensive reaction conditions due to the use of longer reaction times and much higher dilutions. In addition, for some end uses such as that hereinafter described in Example VII, the lignosulphonate-aldonic acid mixture, which contains only about 25% aldonic acids, may be used pound per pound for the pure aldonic acids to give markedly superior results under conditions where lognosulphonates are known to be only slightly effective.

The following examples describe specific embodiments of the present invention:

EXAMPLE I

To 1000 g. of sodium base spent sulphite liquor solution having 45% solids and containing 18.5% reducing sugars (based on the solids) was added 23.8 g. sodium cyanide (representing a 5% excess of the calculated amount) in concentrated solution at 80° C. in a closed autoclave. After a reaction period of 1½ hours, the cyanohydrins formed were hydrolyzed by heating for two hours at 125° C. At the end of the hydrolysis step, tests for reducing sugars and cyanide were negative. Nitrogen analysis of the spray-dried product was as follows: Total N, 0.68%; ammonia N, 0.15%; and organic-bound N, 0.53%. The iron chelating capacity was 0.88 g. Fe per gram of product.

EXAMPLE II

This example illustrates a means of increasing the ratio of nitrogen-containing aldonic acids to aldonic acids in the reaction product.

To 1000 g. of sodium base spent sulphite liquor (45% solids) containing 15.9% reducing sugars (based on the solids) were added 105% of the calculated amount of sodium cyanide and 1.3 mole ammonia per mole sugar. After a reaction period of two hours at 80° C., in a closed autoclave the cyanohydrins formed were hydrolyzed by heating for two hours at 125° C. At the end of the hydrolysis step, tests for reducing sugars and cyanide were negative. Nitrogen analysis of the spray-dried product was as follows: Total N, 2.07%; ammonia N, 1.19%; and organic-bound N, 0.88%.

EXAMPLE III

This example illustrates a process wherein hydrolyzed cane sugar is added to the spent sulphite liquor solution to produce a product having a uniform aldonic acid composition.

To 35 gallons of sodium base sulphite liquor solution (pT 6) was added sufficient hydrolyzed cane sugar to bring the reducing sugar content to 18.5%. The reaction mixture was heated to 50° C. and mixed with 105% of the calculated amount of sodium cyanide. The reaction was complete in the strongly alkaline solution in 2½ hours as evidenced by a negative test for cyanide and a very low reducing sugar content. The cyanohydrin mixture was hydrolyzed for six hours at reflux temperature. The chelating capacity of the spray-dried product was 1.06 g. Fe per gram of product.

EXAMPLE IV

A process for preparing a product containing 40% nitrogen-containing aldonic acids and 10% aldonic acids was carried out as follows:

7 liters of concentrated sodium base spent sulphite liquor solution containing 3780 g. solids (580 g. reducing sugars) was mixed with 1555 g. commercially pure glucose dissolved in 3 liters of water, 600 ml. concentrated ammonia solution and 611 g. sodium cyanide in concentrated solution. The mixture was heated at about 80° C. for two hours in a closed autoclave and then at about 125° C. for another two hours. The reaction product was spray-dried.

EXAMPLE V

A process for preparing a product containing 30% aldonic acids and 20% nitrogen-containing aldonic acids was carried out as follows:

13.7 liters of concentrated sodium base spent sulphite liquors solution containing 7810 g. solids (1260 g. reducing sugars) was mixed with 3820 g. commercially pure glycose in concentrated solution and 1452 g. technical grade sodium cyanide in concentrated solution. The mixture was heated in a closed autoclave at about 80° C. for two hours and then at about 125° C. for another two hours. The reaction product was spray dried.

EXAMPLE VI

A process for preparing a product containing 40% aldonic acids and 10% nitrogen-containing aldonic acids was carried out as described in Example V except that the ammonia generated during the reaction was allowed to escape from the autoclave through continuous bleeding during the entire reaction period.

EXAMPLE VII

This example demonstrates the effectiveness of the new aldonic acid composition as a paint stripping agent as shown in Table I.

A metal plate coated with epoxy resin paint was dipped into the following solutions at boiling point:

(A) In one liter of water there were dissolved 300 g. sodium hydroxide, 60 g. cresol and 60 g. of lignosulfonate-aldonic acid composition of the present invention containing about 25% aldonic acids;

(B) In one liter of water there were dissolved 300 g. sodium hydroxide, 60 g. cresol and 60 g. sodium gluconate; and (C) In one liter of water there were dissolved 300 g. sodium hydroxide and 60 g. cresol.

TABLE I

| | Weight of Plate (g.) | | Paint stripped (g.) after 30 min.[1] |
|---|---|---|---|
| | Before | After | |
| Solutions: | | | |
| A | 54.2650 | 54.0235 | 0.2415 |
| B | 53.7015 | 53.5000 | 0.2015 |
| C | 54.0792 | 53.9150 | 0.1642 |

[1] Average of two determinations.

EXAMPLE VIII

This example demonstrates the effectiveness of the new aldonic acid composition as a sequestering agent. A test method described in United States Patent No. 3,105,822 (J. V. Karabinos et al.) issued Oct. 1, 1963, was used for this evaluation.

A 10 ft. length of stainless steel chain weighing approximately 20 g. was circulated through 2 liters of tap water (hardness, 1000 p.p.m.) containing 60 g. of sodium hydroxide and 10 g. of the sequestering agent under test and maintained at a temperature of 150° F., followed by passage through a 3 liter bath of rinse tap water at 120° F. and back to the caustic solution with one revolution of the chain being made in approximately two minutes. A six-hour running period was used. The results are given in Table II.

TABLE II

| Sequestrant | Weight (g.) of scale |
|---|---|
| (1) Blank | 0.120 |
| (2) Sodium gluconate | 0.020 |
| (3) Aldonic acid (20%), N-containing aldonic acid (5%) composition (Ex. I) | 0.032 |
| (4) Aldonic acid (40%), N-containing aldonic acid (10%) composition (Ex. VI) | 0.017 |
| (5) Aldonic acid (10%), N-containing aldonic acid (40%) (Ex. IV) | 0.007 |

It is apparent that the products of the present invention, sequestrants (4) and (5) containing a total of 50% aldonic acids, are more efficient in scale removal than pure sodium gluconate. The scale removal improves with an increase in the nitrogen-containing aldonic acid content. It thus appears that for this purpose nitrogen-containing aldonic acids are superior to aldonic acids.

EXAMPLE IX

This example illustrates a method of preparing a mixture of glucoheptonic and nitrogen-containing glucoheptonic acids.

4065 g. industrial glucose containing 8% moisture was dissolved in 10 liters of water and mixed with 2 liters of 27% ammonia solution and 1068 g. sodium cyanide in concentrated solution. For each mole of glucose about 1.3 mole ammonia was thus added. The reaction mixture was first heated at 80° C. for two hours and then to 125° C. for two and a half hours in a closed autoclave.

Nitrogen analysis of the reaction product solids indicated that 2.28% organic-bound nitrogen was present or slightly more than 40% nitrogen-containing glucoheptonic acids.

Aliquots of the product were passed through strong ion exchange resin beds. On a strong anion-exchange resin bed (commercially available under the trade name "Dowex 21K") all organic material was retained and only the calculated amount of NaOH was found in the effluent. On a strong cation-exchange resin bed (commercially available under the trade name "Amberlite IR-120") 27.5% of the organic material was removed as cationic. It was thus apparent that part of the organic material contained simultaneously both anionic and cationic functional groups. The material not retained as cationic had 1.96% organic-bound nitrogen. It is thus shown that not all nitrogen-containing aldonic acids are retained as cationic, perhaps because the amine (or imine) groups are not of identical strengths.

The percentage of nitrogen-containing aldonic acids obtained in this example is lower than that obtained in Example IV in spite of the higher ammonia concentration. This difference may be due to different reaction rates with different sugars or to some catalytic effect due to the presence of lagnosulphonates.

I claim:

1. A composition effective as a sequestering agent and a paint stripping agent consisting essentially of a mixture of aldonic and nitrogen-containing aldonic acids when prepared by the steps of
    (a) adding an alkali metal cyanite to a spent sulphite liquor in an amount in excess of that required to react with the monosaccharides present in said liquor to form cyanohydrins, and
    (b) hydrolyzing said cyanohydrins by heating the reaction mixture under reflux conditions.

2. The composition defined in claim 1, wherein said liquor is a sodium base spent sulphite liquor.

3. A process for increasing the chelating capacity of lignosulphonates in spent sulphite liquor by converting the monosaccharides present therein into a mixture of aldonic and nitrogen-containing aldonic acids comprising
    (a) adding an alkali metal cyanide to a spent sulphite liquor in an amount in excess of that required to react with the monosaccharides present in said liquor to form cyanohydrins, and
    (b) hydrolyzing said cyanohydrins by heating the reaction mixture under reflux conditions.

4. The process defined in claim 3, wherein said liquor is a sodium base spent sulphite liquor.

5. A process for the preparation of a mixture of aldonic and nitrogen-containing aldonic acids which comprises reacting a concentrated spent sulphite liquor solution with an amount of alkali metal cyanide in excess of that required to react with the monosaccharides present in said liquor solution to form cyanohydrins for a period of from about 1½ to about 6 hours at a temperature of about 40° C. to 80° C. and then hydrolyzing the cyanohydrins thus produced at reflux temperature.

6. The process defined in claim 5 carried out in a closed autoclave with a pressure during hydrolysis in the range of about 30 to 50 p.s.i.

7. The process defined in claim 5, wherein said liquor solution is a sodium base spent sulphite liquor solution.

8. The process defined in claim 5 wherein the alkali metal cyanide is sodium cyanide.

9. The process defined in claim 5 wherein ammonia is added to the initial reaction mixture to increase the proportion of nitrogen-containing aldonic acids produced.

10. A process for the preparation of a mixture of aldonic and nitrogen-containing aldonic acids which comprises reacting a concentrated sodium base spent sulphite liquor solution with an amount of sodium cyanide in excess of that required to react with the monosaccharides present in said liquor solution in the presence of ammonia for a period of from about 1½ hours to about 6 hours at a temperature of about 80° C. in a closed autoclave and then hydrolyzing the cyanohydrins thus produced at reflux temperature.

11. A process for the preparation of a mixture of aldonic and nitrogen-containing aldonic acids which comprises:
    (a) adding an alkali metal cyanide to a spent sulphite liquor solution in an amount in excess of that required to react with the monosaccharides present in said liquor solution to form cyanohydrins, and
    (b) hydrolyzing said cyanohydrins by heating the reaction mixture under reflux conditions.

References Cited

UNITED STATES PATENTS

| | | | |
|---|---|---|---|
| 2,606,918 | 8/1952 | Isbell | 260—528 |
| 2,791,523 | 5/1957 | Schoen | 260—124 |
| 2,822,358 | 2/1958 | Hearon et al. | 260—124.3 |
| 3,022,343 | 2/1962 | Behnke | 260—528 |
| 3,084,188 | 4/1963 | Horn et al. | 260—535 |
| 3,062,878 | 11/1962 | Karabinos et al. | 260—180 |
| 3,105,822 | 10/1963 | Karabinos et al. | |
| 3,217,034 | 11/1965 | Karabinos et al. | |

LEON D. ROSDOL, Primary Examiner

W. SCHULZ, Assistant Examiner

U.S. Cl. X.R.

134—38; 210—58; 252—82, 142

Disclaimer 3,483,127.—*Julius Benko*, Quebec, Quebec, Canada. NITROGEN-CONTAINING ALDONIC ACID COMPOSITION AND PROCESS OF PRODUCTION. Patent dated Dec. 9, 1969. Disclaimer filed Aug. 13, 1970, by the assignee, *Dryden Chemicals Limited*.

Hereby enters this disclaimer to claims 1, 2, 3, 4 and 11 of said patent.
[*Official Gazette December 8, 1970.*]